United States Patent
Matlick et al.

(10) Patent No.: US 10,372,271 B2
(45) Date of Patent: Aug. 6, 2019

(54) ADJUSTMENT OF TOUCH SENSING STIMULATION VOLTAGE LEVELS BASED ON TOUCH PERFORMANCE

(71) Applicant: Apple Inc., Cupertino, CA (US)

(72) Inventors: Jacob L. Matlick, San Francisco, CA (US); Adam Geboff, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/335,551

(22) Filed: Jul. 18, 2014

(65) Prior Publication Data

US 2016/0018921 A1   Jan. 21, 2016

(51) Int. Cl.
G06F 3/044 (2006.01)
G06F 3/041 (2006.01)
G06F 1/3234 (2019.01)

(52) U.S. Cl.
CPC ............ G06F 3/044 (2013.01); G06F 1/3262 (2013.01); G06F 3/0416 (2013.01)

(58) Field of Classification Search
CPC ..................................................... G06F 3/041
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,237,667 B2 | 8/2012 | Krah | |
| 8,479,122 B2 | 7/2013 | Hotelling et al. | |
| 8,493,331 B2 | 7/2013 | Krah et al. | |

(Continued)

FOREIGN PATENT DOCUMENTS

| CN | 102662518 A | 9/2012 |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Alexander Eisen
*Assistant Examiner* — Cory A Almeida
(74) *Attorney, Agent, or Firm* — Kubota & Basol LLP

(57) ABSTRACT

The adjustment of stimulation signal amplitudes in capacitive touch sensor panels and/or styli to reduce power consumption while preserving satisfactory touch performance is disclosed, in particular in situations where the noise level is not significant and there is excess SNR margin. To accomplish this, one or more metrics can be measured, calculated or otherwise determined to use as a predictor of touch performance, and these metrics can be processed to determine the minimum stimulation voltage required to maintain acceptable touch performance.

27 Claims, 10 Drawing Sheets

(56) References Cited

U.S. PATENT DOCUMENTS

| | | | |
|---|---|---|---|
| 8,988,384 | B2 | 3/2015 | Krah et al. |
| 2006/0197753 | A1 | 9/2006 | Hotelling |
| 2009/0009483 | A1* | 1/2009 | Hotelling .............. G06F 3/0416 345/173 |
| 2011/0061947 | A1 | 3/2011 | Krah et al. |
| 2011/0063993 | A1 | 3/2011 | Wilson et al. |
| 2013/0265243 | A1 | 10/2013 | Law |
| 2014/0057681 | A1 | 2/2014 | Grivas et al. |
| 2014/0132525 | A1* | 5/2014 | Pyo ..................... G06F 3/0412 345/173 |
| 2014/0218331 | A1* | 8/2014 | Chang ................... G06F 3/044 345/174 |
| 2015/0153870 | A1* | 6/2015 | Lee ..................... G06F 3/0416 345/174 |
| 2015/0253894 | A1* | 9/2015 | Mckenzie ............... G06F 3/044 345/174 |
| 2015/0261340 | A1 | 9/2015 | Krah |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

European Search Report dated Nov. 16, 2015, for EP Application No. 15173362.3, five pages.

Chinese Search Report dated Sep. 29, 2017, for CN Application No. 201510422555.x, with English translation, four pages.

\* cited by examiner

ADJUSTMENT OF TOUCH SENSING STIMULATION VOLTAGE LEVELS BASED ON TOUCH PERFORMANCE

FIELD OF THE DISCLOSURE

This relates generally to touch sensor panels and stylus sensing, and in particular to the adjustment of stimulation signal amplitudes in capacitive touch sensor panels and/or styli to reduce power consumption while preserving satisfactory touch performance.

BACKGROUND OF THE DISCLOSURE

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned in front of a display screen so that the touch-sensitive surface covers the viewable area of the display screen. Touch screens can allow a user to make selections, move a cursor, or perform drawing operations, to name just a few examples, by simply touching the display screen via a finger or stylus. In general, the touch screen can recognize a touch and position of the touch on the display screen, and the computing system can interpret the touch and perform an action based on the touch event.

One or more stimulation signals can be applied to the drive lines of a mutual capacitance touch sensor panel, and these signals can be capacitively coupled onto the sense lines. Alternatively, the stimulation signals can be applied to the sense electrodes of a self-capacitance touch sensor panel. In either situation, the amplitude of the sense signals appearing on the sense lines or sense electrodes can be affected by an object touching or in proximity to the touch sensor panel. In order to properly detect the presence and location of the object, the amplitude of the sense signals should be large enough that the variations in the sense signals due to the object can be accurately detected and located even in the presence of noise. In other words, the signal-to-noise ratio (SNR) should be maintained at a certain level for acceptable touch performance. To accomplish this, conventional touch sensing systems operate at a fixed stimulation signal voltage independent of power requirements, and also regardless of SNR margin. The fixed stimulation voltage is often chosen to ensure proper operation even in a worst-case noise situation. However, by operating to worst-case conditions, in most environments without worst-case noise there can be excess SNR and unnecessary power consumption.

SUMMARY OF THE DISCLOSURE

Examples of the disclosure are directed to the adjustment of stimulation signal amplitudes in capacitive touch sensor panels and/or styli to reduce power consumption while preserving satisfactory touch performance, in particular in situations where the noise level is not significant and there is excess SNR margin. To accomplish this, examples of the disclosure calculate one or more metrics to use as a predictor of touch performance, and process these metrics to determine the minimum stimulation voltage required to maintain acceptable touch performance.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure are directed to the adjustment of stimulation signal amplitudes in capacitive touch sensor panels and/or styli to reduce power consumption while preserving satisfactory touch performance, in particular in situations where the noise level is not significant and there is excess SNR margin. To accomplish this, examples of the disclosure calculate one or more metrics to use as a predictor of touch performance, and process these metrics to determine the minimum stimulation voltage required to maintain acceptable touch performance.

Figure 1D:
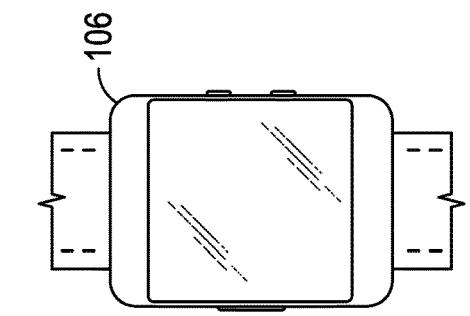
FIGS. 1A-1D illustrate end-user devices in which some examples of the disclosure can be implemented.
Figure 1C:
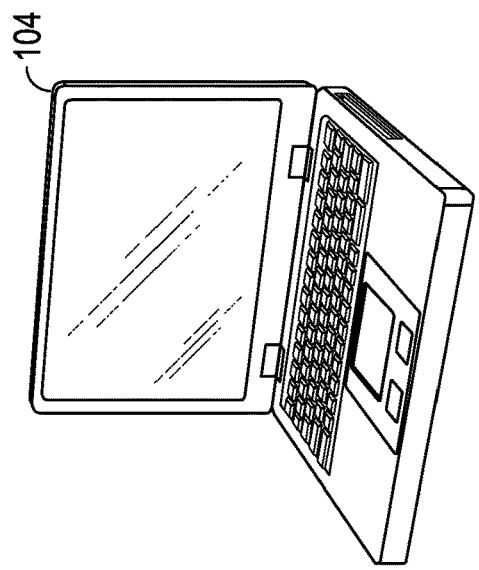
Figure 1B:
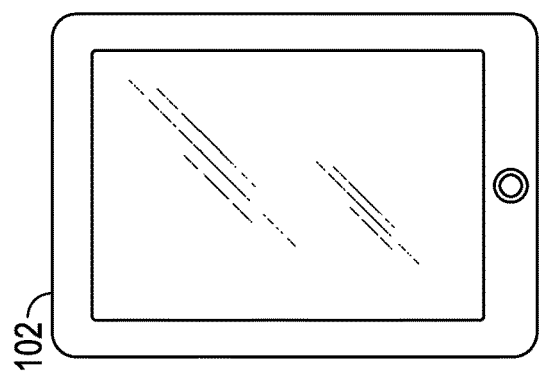
Figure 1A:
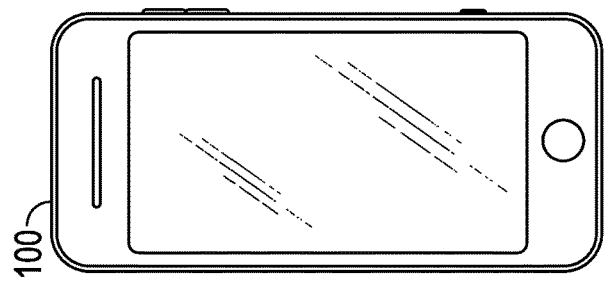

FIGS. 1A-1D illustrate end-user devices in which some examples of the disclosure can be implemented. FIG. 1A illustrates an exemplary mobile smartphone 100 that can include a touch panel with stimulation voltage reduction according to some examples of the disclosure. FIG. 1B illustrates an exemplary tablet computing device 102 that can include a touch panel with stimulation voltage reduction according to some examples of the disclosure. FIG. 1C illustrates an exemplary laptop computing device 104 that can include a touch panel with stimulation voltage reduction according to some examples of the disclosure. FIG. 1D illustrates an exemplary wearable device 106 that can include a touch panel with stimulation voltage reduction according to some examples of the disclosure.

Figure 2:
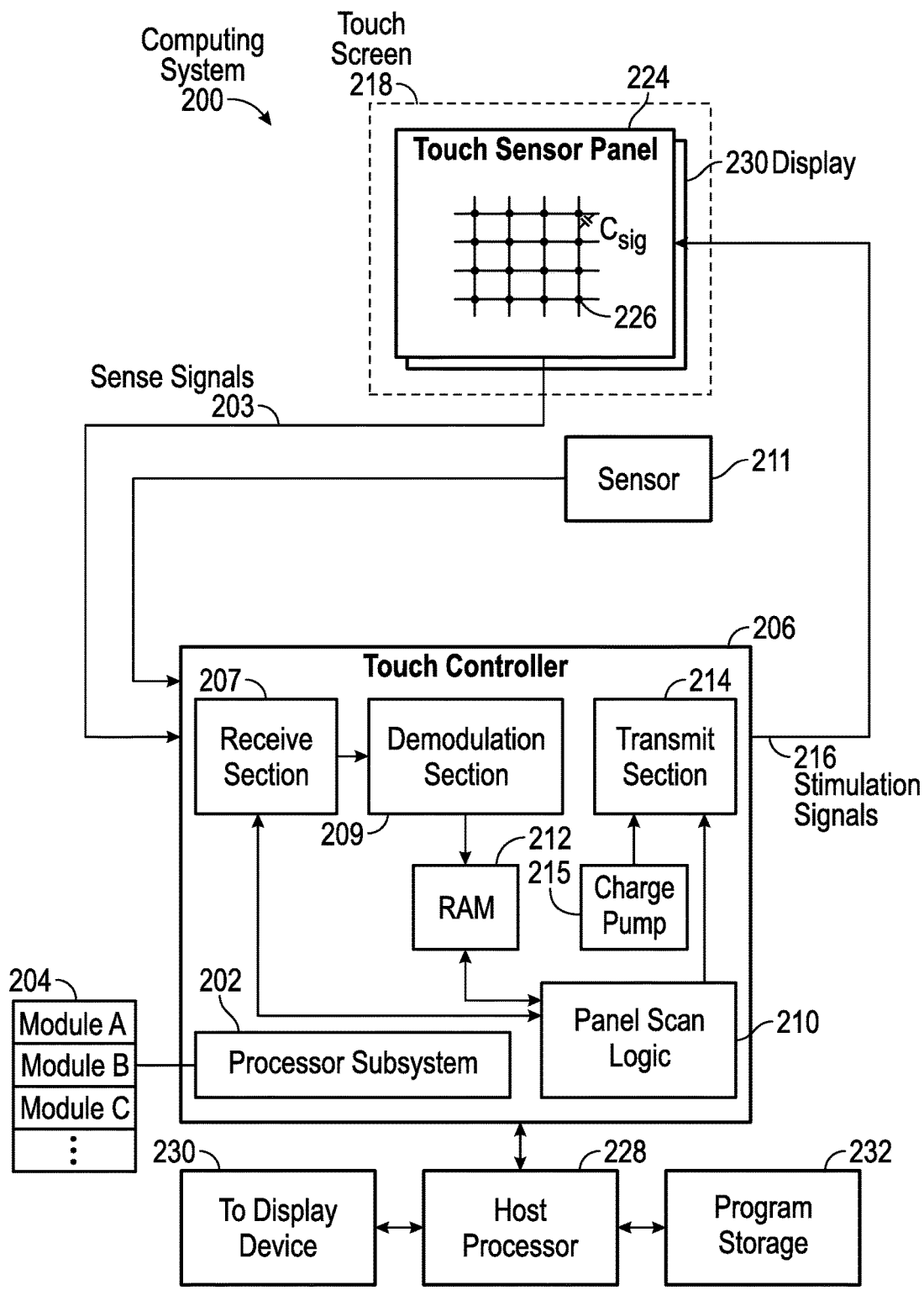
FIG. 2 illustrates an exemplary computing system capable of implementing stimulation voltage reduction according to some examples of the disclosure.

FIG. 2 illustrates an exemplary computing system 200 capable of implementing stimulation voltage reduction according to some examples of the disclosure. Computing system 200 can be included in any electronic device such as the one or more exemplary devices illustrated in FIGS. 1A-1D. Touch controller 206 can be a single application specific integrated circuit (ASIC) that can include one or more processor subsystems such as processor subsystem 202, which can include, for example, one or more main processors, such as ARM968 processors or other processors with similar functionality and capabilities. However, in other examples, some of the processor functionality can be implemented instead by dedicated logic, such as a state machine, or multiple processors. Processor subsystem 202 can also include, for example, peripherals such as random access memory (RAM) 212 or other types of memory or storage, watchdog timers (not shown), and the like. Processor subsystem can access and execute one or more software and/or firmware modules 204 for performing the functions described herein. It should be understood that although computing system 200 illustrates a mutual capacitance touch sensing system according to some examples of the disclosure, in other examples a self-capacitance touch sensing system can be employed.

Touch controller 206 can also include, for example, receive section 207 for receiving signals, such as touch sense signals 203, from the sense lines of touch sensor panel 224, and other signals from other sensors such as sensor 211, etc. Touch controller 206 can also include, for example, a demodulation section 209, panel scan logic 210, and a drive system including, for example, transmit section 214. Receive section 207 and transmit section 214 may be referred to herein as transceiver sections. Panel scan logic 210 can access RAM 212, autonomously read data from the sense channels, and provide control for the sense channels. In addition, panel scan logic 210 can control transmit section 214 to generate stimulation signals 216 at various frequencies, phases and amplitudes that can be selectively applied to the drive lines of the touch sensor panel 224 in mutual capacitance examples. However, it should be understood that in self-capacitance examples, all lines (e.g., row and column lines) or individual electrodes can be configured as sense electrodes, and stimulation signals can be applied to all sense electrodes using sense amplifiers in the receive section 207.

Charge pump 215 can be used to generate the supply voltage for the transmit section. Stimulation signals 216 (Vstim) can have amplitudes higher than the maximum voltage the ASIC process can tolerate by cascading transistors. Therefore, using charge pump 215, the stimulus voltage can be higher (e.g., 6V) than the voltage level a single transistor can handle (e.g., 3.6 V). Although FIG. 2 shows charge pump 215 separate from transmit section 214, the charge pump can be part of the transmit section. In some examples of the disclosure, charge pump 15 can control the supply voltage to change the stimulation signal amplitudes. In some examples (not shown in FIG. 2), the stimulation signals 216 can be generated not by the touch controller 206, but rather by an active stylus. In these examples, the stimulation signals from the active stylus can couple onto the rows and/or columns of the touch sensor panel 224.

Touch sensor panel 224 can include a capacitive sensing medium having a plurality of drive lines and a plurality of sense lines in mutual capacitance examples, or sense electrodes in self-capacitance examples. The drive and sense lines or electrodes can be formed from a transparent conductive medium such as Indium Tin Oxide (ITO) or Antimony Tin Oxide (ATO), although other transparent and non-transparent materials such as copper can also be used. In some examples, the drive and sense lines or sense electrodes can be perpendicular to each other, although in other examples other non-Cartesian orientations are possible. For example, in a polar coordinate mutual capacitance touch sensing system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces or other geometric configurations having first and second dimensions (e.g., the concentric and radial lines of a polar-coordinate arrangement). The drive and sense lines or sense electrodes can also be formed on, for example, a single side of a substantially transparent substrate.

In mutual capacitance examples, at the "intersections" of the traces, where the drive and sense lines can pass adjacent to and above and below (cross) each other (but without making direct electrical contact with each other) or arranged adjacent to each other, the drive and sense lines can essentially form two electrodes (although more than two traces could intersect as well). Each intersection or adjacency of drive and sense lines can represent a capacitive sensing node and can be viewed as touch pixel or node 226, which can be particularly useful when touch sensor panel 224 is viewed as capturing an "image" of touch. (In other words, after touch controller 206 has determined whether a touch event has been detected at each touch sensor in the touch sensor panel, the pattern of touch sensors in the multi-touch sensor panel at which a touch event occurred can be viewed as an "image" of touch (e.g., a pattern of fingers touching the panel.) The capacitance between drive and sense electrodes can appear as stray capacitance when the given row is held at direct current (DC) voltage levels and as a mutual capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 200 can also include host processor 228 for receiving outputs from processor subsystem 202 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Host processor 228 can perform additional functions that may not be related to panel processing, and can be coupled to program storage 232 and display 230, such as an LCD display, for providing a user interface to a user of the device. In some examples, host processor 228 can be a separate component from touch controller 206, as shown. In some examples, host processor 228 can be included as part of touch controller 206. In some examples, the functions of host processor 228 can be performed by processor subsystem 202 and/or distributed among other components of touch controller 206. Display 230 together with touch sensor panel 224, when located partially or entirely under the touch sensor panel 224, can form touch screen 218.

As mentioned above, one or more of the functions described herein can be performed, for example, by firmware stored in memory (e.g., one of the peripherals) and executed by processor subsystem 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

The firmware can be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

Figure 3A:
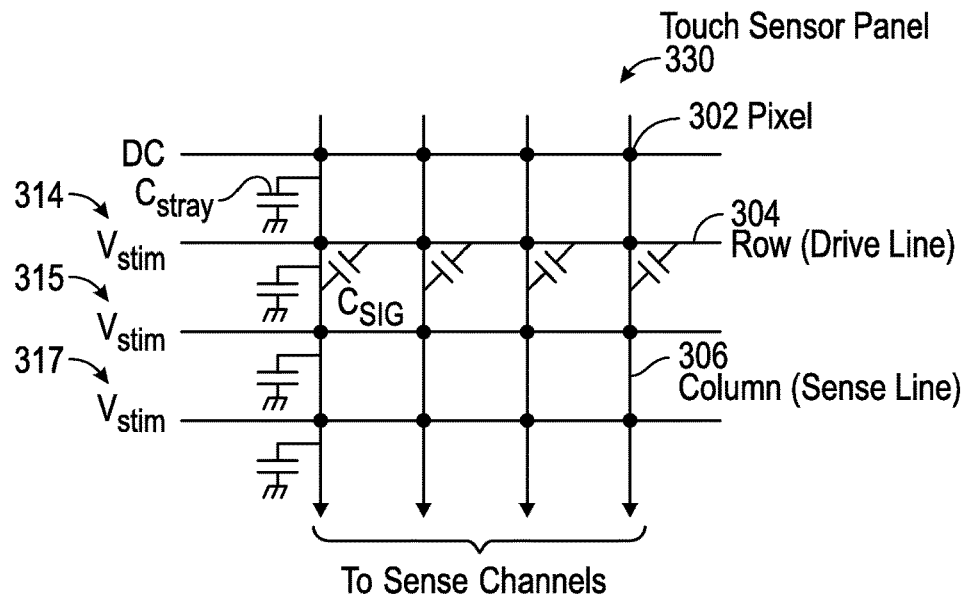
FIG. 3A illustrates an exemplary mutual capacitance touch sensor panel according to some examples of the disclosure.

FIG. 3A illustrates an exemplary mutual capacitance touch sensor panel according to some examples of the disclosure. Stray capacitance Cstray can be present at each pixel 302 located at the intersection of a row 304 and a column 306 trace (although Cstray for only one column is illustrated in FIG. 3A for purposes of simplifying the figure) of touch sensor panel 330. In the example of FIG. 3A, AC stimuli Vstim 314, Vstim 315 and Vstim 317 can be at different frequencies and phases. Each stimulation signal on a row can cause a charge Qsig=Csig×Vstim to be injected into the columns through the mutual capacitance present at the affected pixels. A change in the injected charge (Qsig_sense) can be detected when a finger, palm or other object is present at one or more of the affected pixels. Vstim signals 314, 315 and 317 can include one or more bursts of sine waves. Note that although FIG. 3A illustrates rows 304 and columns 306 as being substantially perpendicular, they need not be aligned, as described above. As described above, each column 306 can be connected to a receive channel such as receive section 207 of FIG. 2.

Figure 3B:
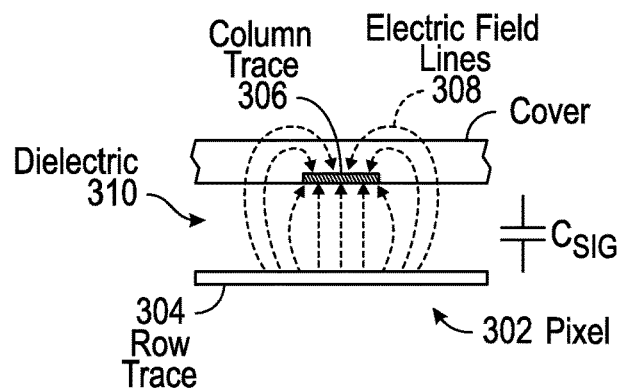
FIG. 3B illustrates a side view of an exemplary pixel in a steady-state (no-touch) condition according to some examples of the disclosure.

FIG. 3B illustrates a side view of an exemplary pixel in a steady-state (no-touch) condition according to some examples of the disclosure. In FIG. 3B, electric field lines 308 between a column trace 306 and a row trace 304 separated by dielectric 310 is shown at pixel 302. In active stylus examples (not shown in FIG. 3B), the electric field lines 308 can form between the active stylus and the column trace 306.

Figure 3C:
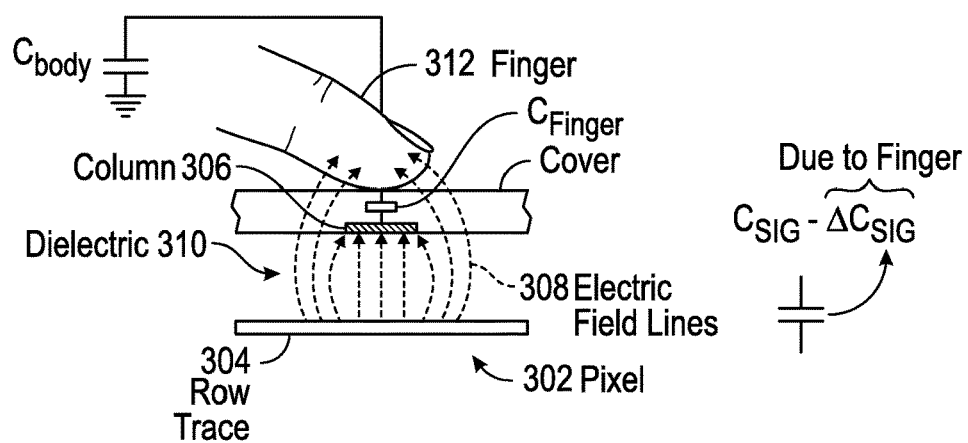
FIG. 3C illustrates a side view of an exemplary pixel in a dynamic (touch) condition according to some examples of the disclosure.

FIG. 3C illustrates a side view of an exemplary pixel in a dynamic (touch) condition according to some examples of the disclosure. An object such as finger 312 can be placed near pixel 302. Finger 312 can be a low-impedance object at signal frequencies, and can have an AC capacitance Cfinger from the column trace 306 to the body. The body can have a self-capacitance to ground Cbody of about 200 pF, where Cbody can be much larger than Cfinger. If finger 312 blocks some electric field lines 308 between row and column electrodes (those fringing fields that exit the dielectric 310 and pass through the air above the row electrode), those electric field lines can be shunted to ground through the capacitance path inherent in the finger and the body, and as a result, the steady state signal capacitance Csig can be reduced by ΔCsig. In other words, the combined body and finger capacitance can act to reduce Csig by an amount ΔCsig (which can also be referred to herein as Csig_sense), and can act as a shunt or dynamic return path to ground, blocking some of the electric field lines as resulting in a reduced net signal capacitance. The signal capacitance at the pixel becomes Csig−ΔCsig, where ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as finger 312 is pushed harder or more completely onto the touch sensor panel, finger 312 can tend to flatten, blocking more and more of the electric fields lines 308, and thus ΔCsig can be variable and representative of how completely finger 312 is pushing down on the panel (i.e., a range from "no-touch" to "full-touch"). In active stylus examples, it is the presence of charge coupled onto the columns 306 that is detected as an indication of a touching object.

Figure 4:
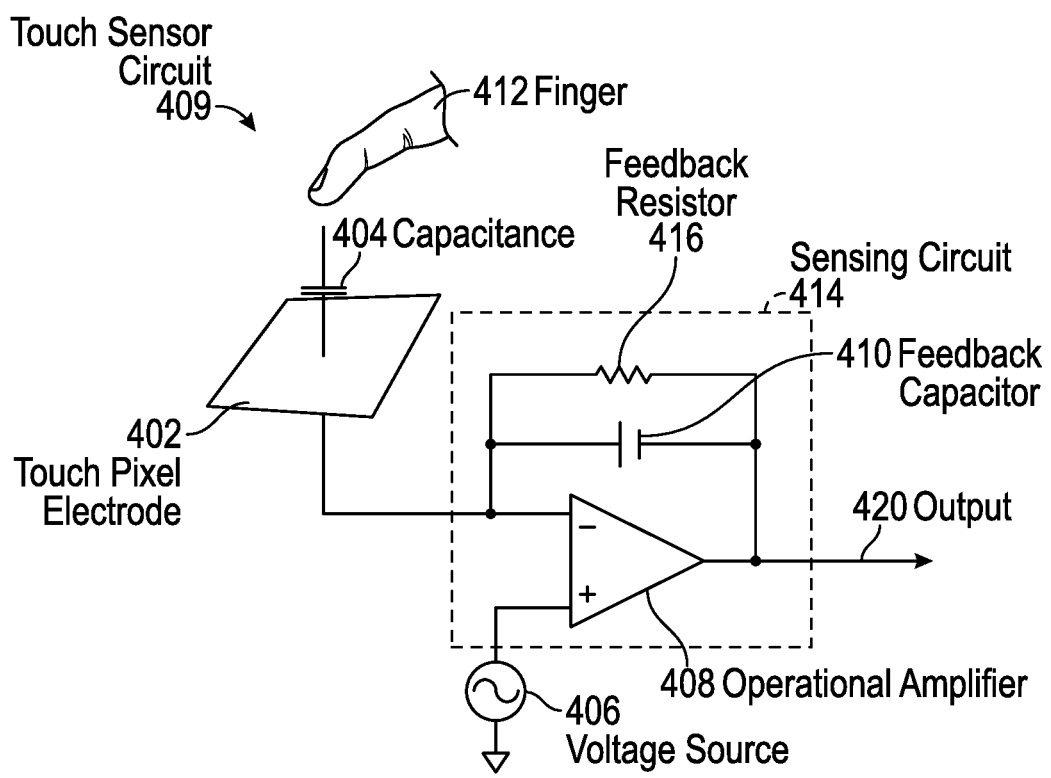
FIG. 4 illustrates an exemplary touch sensor circuit corresponding to a self-capacitance touch pixel electrode and sensing circuit according to some examples of the disclosure.

FIG. 4 illustrates an exemplary touch sensor circuit 409 corresponding to a self-capacitance touch pixel electrode and sensing circuit according to some examples of the disclosure. Touch sensor circuit 409 can have a touch pixel electrode 402 with an inherent self-capacitance to ground associated with it, and also an additional self-capacitance to ground that can be formed when an object, such as finger 412, is in proximity to or touching the touch pixel electrode 402. The total self-capacitance to ground of touch pixel electrode 402 can be illustrated as capacitance 404. Touch pixel electrode 402 can be coupled to sensing circuit 414. Sensing circuit 414 can include an operational amplifier 408, feedback resistor 416, feedback capacitor 410 and an input voltage source 406, although other configurations can be employed. For example, feedback resistor 416 can be replaced by a switch capacitor resistor. Touch pixel electrode 402 can be coupled to the inverting input of operational amplifier 408. An AC voltage source 406 can be coupled to the non-inverting input of operational amplifier 408. Touch sensor circuit 409 can be configured to sense changes in the total self-capacitance 404 of touch pixel electrode 402 induced by finger 412 either touching or in proximity to the touch sensor panel. Output 420 can be used by a processor to determine a presence of a proximity or touch event, or the output can be inputted into a discreet logic network to determine the presence of a touch or proximity event.

Figure 5A:
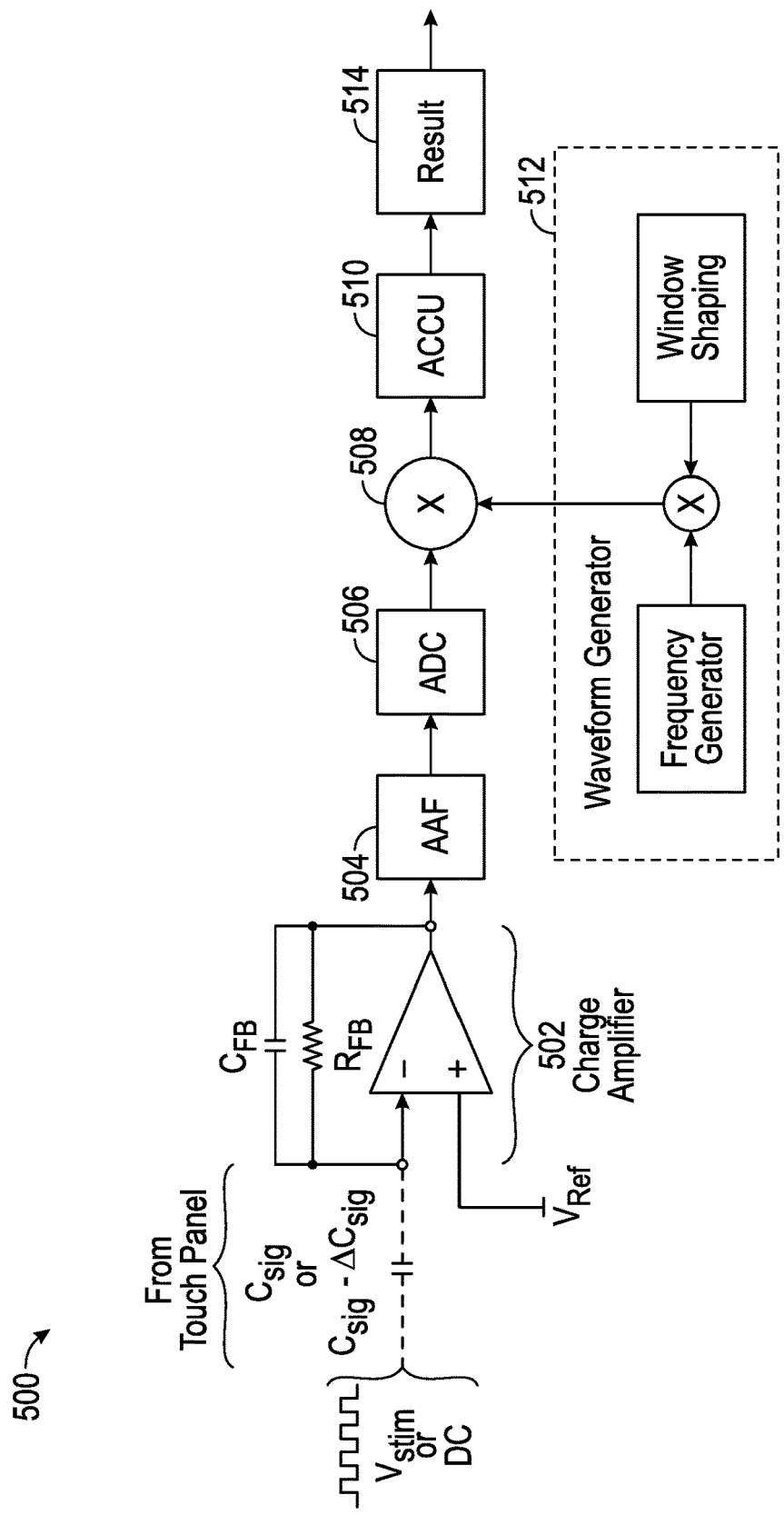
FIG. 5A illustrates an exemplary sense channel according to some examples of the disclosure.

FIG. 5A illustrates an exemplary sense channel 500 according to some examples of the disclosure. One or more sense channels 500 can be present in a touch system, such as the touch system of FIG. 2. Referring again to FIG. 5A, one or more sense lines of a touch sensor panel can be coupable to each sense channel 500. Each sense channel 500 can include charge amplifier 502, anti-aliasing filter 504 and analog-to-digital converter (ADC) 506, digital mixer 508 (e.g., multiplier circuit) and accumulator 510. Charge amplifier 502, anti-aliasing filter 504, and analog-to-digital converter (ADC) 506, along with other components now show for purposes of simplifying the figure, can comprise the "front-end" of these sense channel 500. Digital mixer 508 can be driven by numerically controlled oscillator (NCO) 512 that may include amplitude window shaping using a window function. FIG. 5A illustrates a mutual capacitance example where a drive line can be driven by an input signal (e.g., Vstim or a DC signal), resulting in a steady state signal capacitance Csig when no finger, palm or object is present or a dynamic signal capacitance Csig–ΔCsig when a finger, palm or other object is present. Sense channel 500 can receive a signal representative of the capacitance or change in capacitance (Csig or Csig–ΔCsig) from a touch panel and convert it into the digital domain, demodulate the digital signal with a demodulation waveform in mixer 508 and accumulate the output in accumulator 510. The accumulated output can then be stored in result register 514 and made available for further processing. In accordance with some examples, receive channel 500 can be implemented as part of an ASIC. Although FIG. 5A illustrates a mutual capacitance example, it should be understood that the sense channel of FIG. 5A can also be utilized for self-capacitance panels, wherein the inverting input of charge amplifier 502 can be connected to a self-capacitance to ground, and the noninverting input can be connected to a signal generator.

Figure 5B:
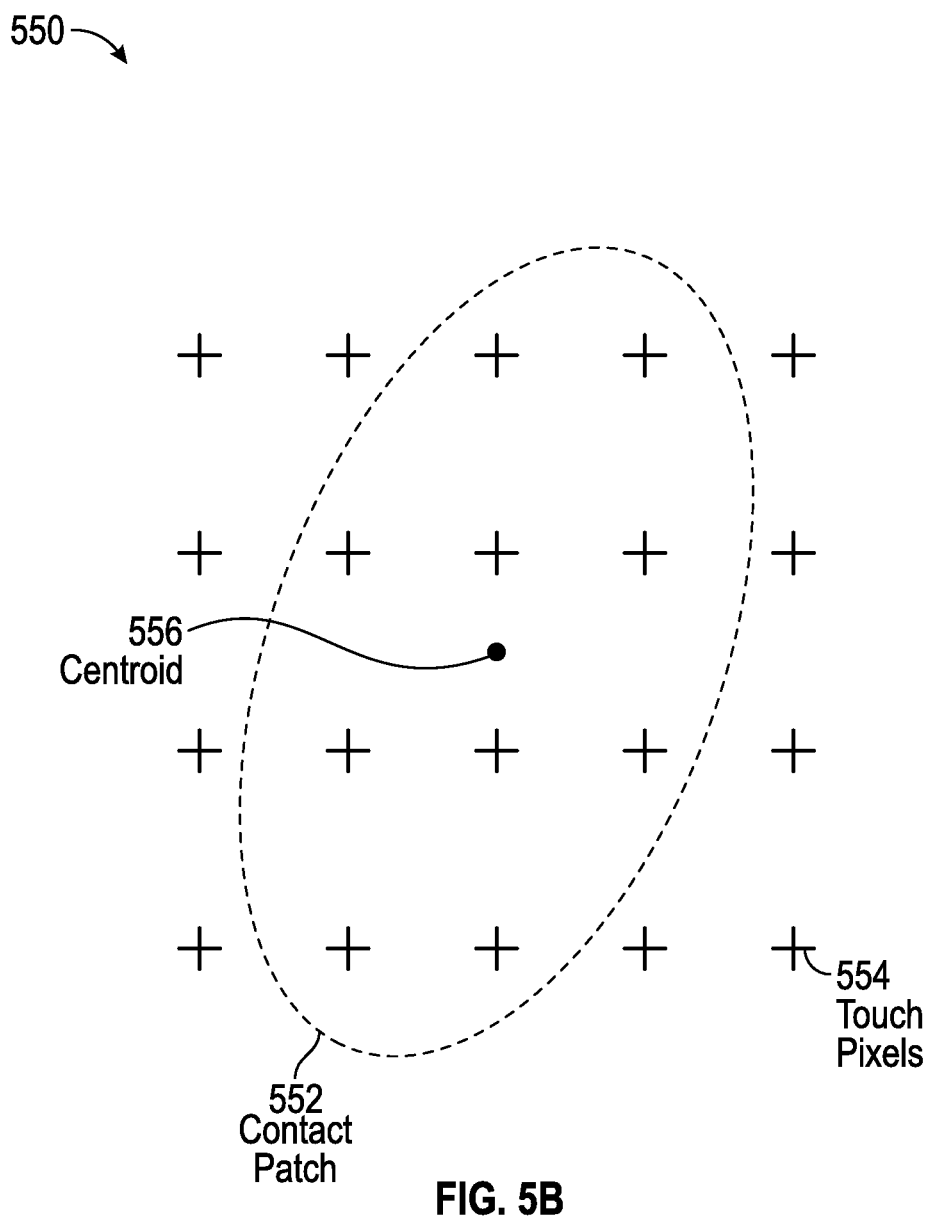
FIG. 5B illustrates an exemplary touch sensor panel portion, a touch patch detected in that panel portion, and a calculated centroid of that patch according to some examples of the disclosure.

FIG. 5B illustrates an exemplary touch sensor panel portion 550, a contact patch detected in that panel portion, and a calculated centroid of that patch according to some examples of the disclosure. In the example of FIG. 5B, the outline or contact patch of a touching object is shown at 552. Touch pixels 554 in the touch sensor panel portion 550 are identified with a "+" symbol, and those touch pixels within the contact patch 552 can have varying touch values that are different from their no-touch counterparts. An algorithm (e.g., a watershed algorithm) can be implemented to determine the boundaries 552 of the contact patch. The touch values of the touch pixels within the contact patch can be used to compute a centroid 556. However, the computed touch values for each of the touch pixels within the contact patch can be a function of the stimulation signal applied to the touch sensor panel and any noise on the panel, and thus the centroid 556 can also be a function of the stimulation signal applied to the touch sensor panel and any noise on the panel.

According to some examples of the disclosure, prior to determining the lowest stimulation voltage level that can be applied to a touch sensor panel while maintaining acceptable touch performance, one or more parameters or metrics indicative of touch pixel noise can be measured or calculated. In other examples, both touch pixel noise and the SNR of the sense channel amplifier outputs can be measured or calculated. In still other examples, touch location jitter can be simulated.

Figure 6:
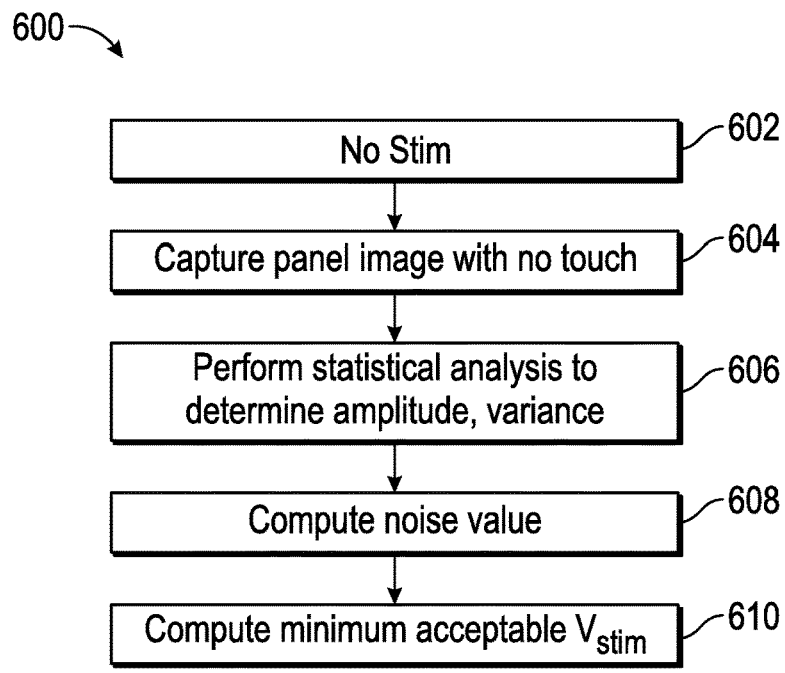
FIG. 6 illustrates an exemplary algorithm for determining the noise levels experienced by the touch system and determining a minimum acceptable stimulation voltage according to some examples of the disclosure.

FIG. 6 illustrates an exemplary algorithm 600 for determining the noise levels experienced by the touch system and determining a minimum acceptable stimulation voltage according to some examples of the disclosure. In the example of FIG. 6, no stimulation signals are applied to the touch sensor panel at block 602. The sense channels can capture sense signals on the sense lines (i.e., capture a panel image) in the absence of a stimulation signal at block 604. In some examples, the sense signals can also be captured at block 604 in the absence of touch. Because of the lack of touch, it can be assumed that any variations in these captured sense signals can be due to noise in the system or noise acting upon the system. In some examples, these sense signals can be captured over a predetermined number of frames or time period, in the background during normal device operation, and then a statistical analysis can be performed on the sense signals to determine an average amplitude, variance, or other statistical measure for those sense signals on a per-pixel basis at block 606 to compute a measure of the noise (a noise value) at each pixel at block 608. However, because computing noise on a per-pixel basis requires that a full scan be performed, in some examples of the disclosure sense signals that capture noise on a column-wise or row-wise basis can be obtained to speed up the calculation of noise measurements.

In some examples of the disclosure, the sense signals can be demodulated at known operating frequencies, accumulated, stored, and subjected to statistical analysis to determine the noise at those frequencies. In some examples, an analysis of the sense signals can be performed at the front end of the sense channels, which can reduce or eliminate the need for downstream statistical analysis.

It should be understood that in some examples of the disclosure, sensing can be performed on columns, rows, or both. Regardless of which traces are being used for sensing, noise can be picked up on both the rows and the columns. The algorithm of FIG. 6 can be applied whether the sense signals are obtained from the columns, rows, or both.

Figure 7:
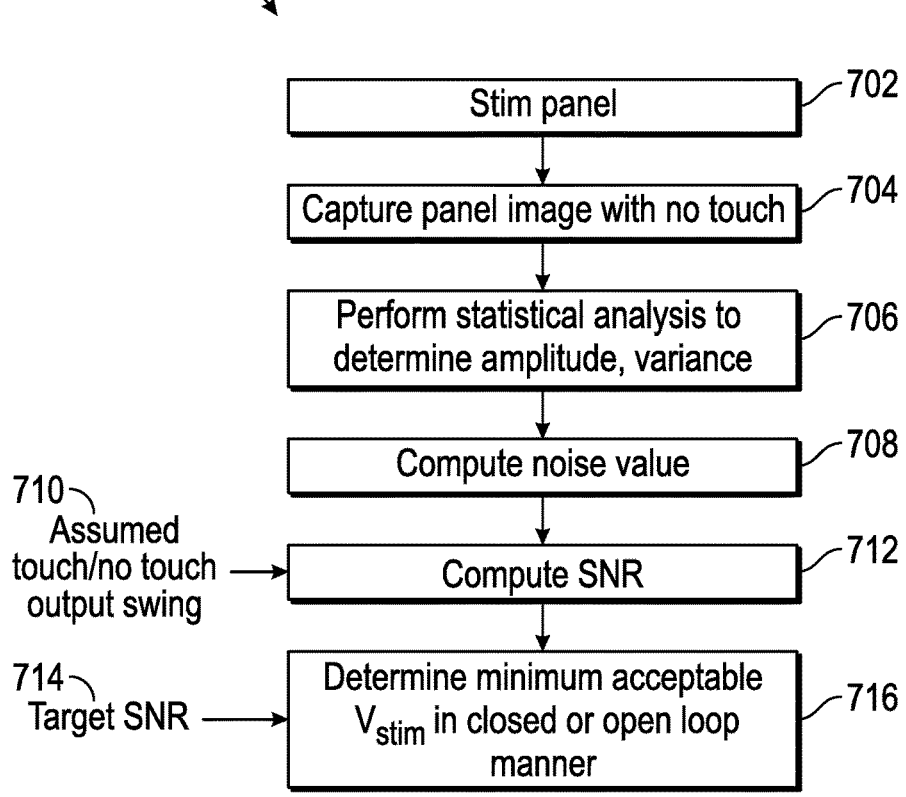
FIG. 7 illustrates an exemplary algorithm for determining the noise levels and predicted SNR experienced by the touch system and determining a minimum acceptable stimulation voltage according to some examples of the disclosure.

FIG. 7 illustrates an exemplary algorithm 700 for determining the noise levels and predicted SNR experienced by the touch system and determining a minimum acceptable stimulation voltage according to some examples of the disclosure. In some examples, stimulation signals can be applied to the touch sensor panel at block 702. The sense channels can capture sense signals on the sense lines (i.e., capture a panel image) in the absence of a touch and in the presence of a stimulation signal at block 704. Because of the lack of touch, it can be assumed that any variations in these captured sense signals can be due to noise in the system or noise acting upon the system. In some examples, these sense signals can be captured over a predetermined number of frames or time period, in the background during normal device operation when no touch is detected, and then a statistical analysis can be performed on the sense signals to determine an average amplitude, variance, or other statistical measure for those captured sense signals on a per-pixel basis at block 706 to compute a measure of the noise at each pixel at block 708.

In some examples of the disclosure, the sense signals can be demodulated at known operating frequencies, accumulated, stored, and subjected to statistical analysis to determine the noise at those frequencies. In other examples, an analysis of the sense signals can be performed at the front end circuitry of the sense channels, which can reduce or eliminate the need for downstream statistical analysis.

It should be understood that in some examples of the disclosure, sensing can be performed on columns, rows, or both. Regardless of which traces are being used for sensing, noise can be picked up on both the rows and the columns. The algorithm of FIG. 7 can be applied whether the sense signals are obtained from the columns, rows, or both.

In order to compute an SNR from the computed noise values, a parameter of interest is how much the output signal changes when the panel is touched (i.e., the difference in signal amplitude between a touch condition and a no-touch condition). However, in the example of FIG. 7, there is no touch present, so the output signal is constant and the difference between the touch and no-touch signal levels are unknown. Accordingly, at 710, touch and no-touch signal levels (and the difference between the two) can be assumed based on characterization or inferred grounding level, for example. Given the assumed signal levels and the computed noise values, an estimated SNR can be computed at 712.

Figure 8:
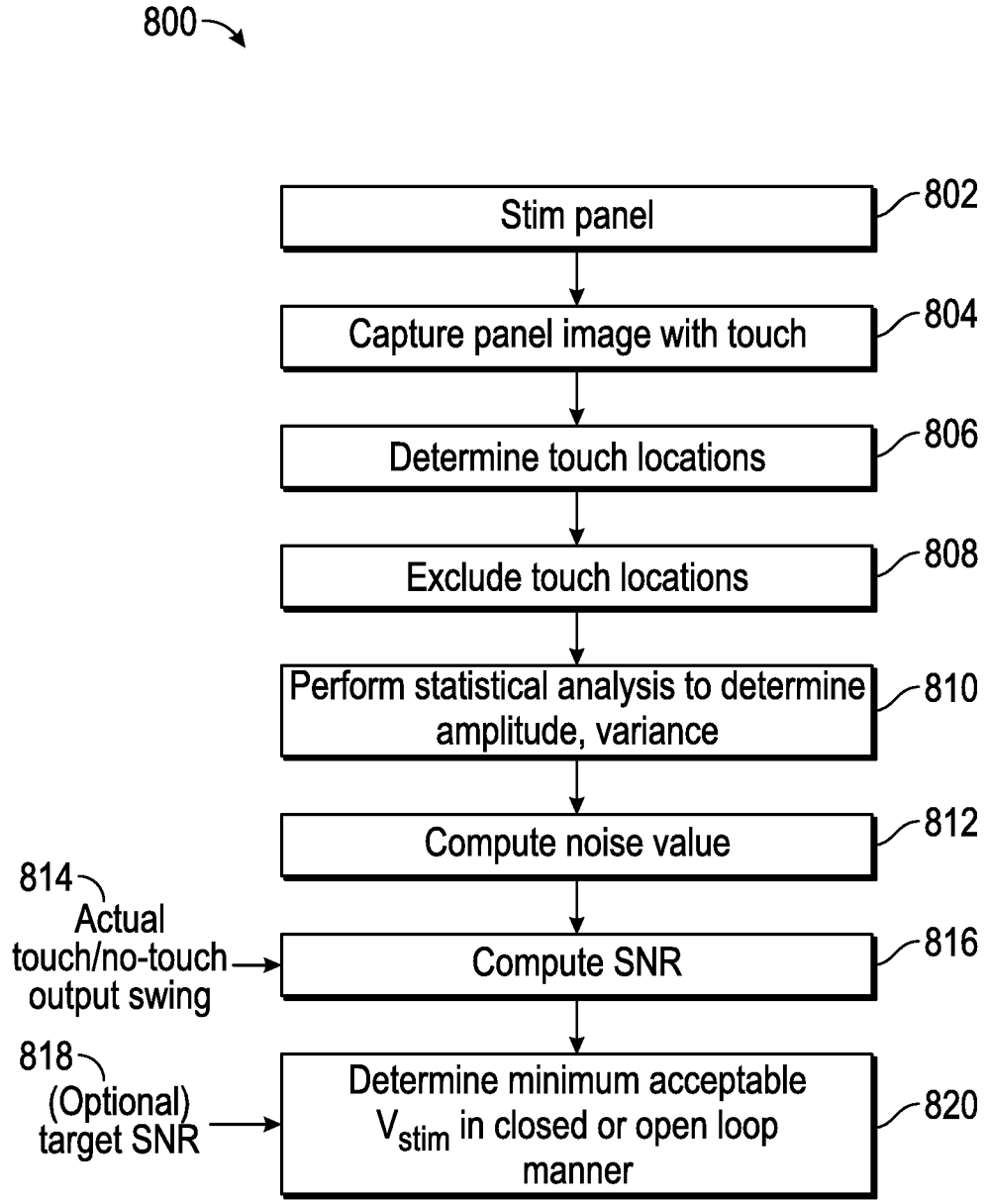
FIG. 8 illustrates an exemplary algorithm for determining the noise levels and actual SNR experienced by the touch system and determining a minimum acceptable stimulation voltage according to some examples of the disclosure.

FIG. 8 illustrates an exemplary algorithm 800 for determining the noise levels and actual SNR experienced by the touch system and determining a minimum acceptable stimulation voltage according to some examples of the disclosure. In some examples, stimulation signals can be applied to the touch sensor panel at block 802. The sense channels can capture sense signals on the sense lines (i.e., capture a touch image) in the presence of a stimulation signal when one or more touches are detected at block 804. In some examples, these sense signals can be captured over a predetermined number of frames or time period, in the background during normal device operation when a touch is detected. Upon capturing the touch image, algorithms (e.g., a watershed algorithm) can be implemented to determine the touch locations (e.g., contact patch boundaries) at block 806. These touch locations can then be excluded from the subsequent statistical analysis at 808. In other words, the statistical analysis can be performed only on those pixel locations without a detected touch. In some examples, the statistical analysis can be performed on the sense signals at those no-touch pixel locations to determine an average amplitude, variance, or other statistical measure for those sense signals on a per-pixel basis at 810 to compute a measure of the noise at each no-touch pixel at 812.

In some examples of the disclosure, the sense signals can be demodulated at known operating frequencies, accumulated, stored, and subjected to statistical analysis to determine the noise at those frequencies. In some examples, an analysis of the sense signals can be performed at the front end of the sense channels, which can reduce or eliminate the need for downstream statistical analysis.

It should be understood that in some examples of the disclosure, sensing can be performed on columns, rows, or both. Regardless of which traces are being used for sensing, noise can be picked up on both the rows and the columns. The algorithm of FIG. 8 can be applied whether the sense signals are obtained from the columns, rows, or both.

In order to compute an SNR from the computed noise values, a parameter of interest is how much the output signal changes when the panel is touched (i.e., the difference in signal amplitude between a touch condition and a no-touch condition). However, in the example of FIG. 8, there is a touch present, so the difference between the touch and no-touch signal levels is known. Accordingly, at 814, actual touch and no-touch signal levels (and the difference between the two) can be measured. Given the actual touch/no-touch output voltage signal levels and the computed noise values at the no-touch pixels, an actual SNR can be computed at 816.

The example of FIG. 8 (with touch) differs from the no-touch examples of FIGS. 6 and 7 in that the actual touch/no-touch sense amplifier output voltage swings at the touch locations can be known or measured and used in the SNR calculation, instead of having to assume a touch/no-touch sense amplifier output voltage swing. This can be important because touch/no-touch sense amplifier output voltage swings can vary, depending on the grounding condition of the touching object, among other things.

As discussed above, examples of the disclosure are directed to reducing touch sensor panel stimulation voltage levels while maintaining acceptable touch performance. In other words, a determined touch pixel noise level, and in some examples, the calculation of an estimated or actual SNR based on the determined noise level, can be used as noise metrics to help determine a lowest acceptable stimulation voltage level. However, in some examples, touch performance can be evaluated directly from the stability (e.g., jitter) of a computed touch position (e.g., the computed centroid of a contact patch), and the lowest acceptable stimulation voltage level can be determined from that stability measure. For example, when a user touches a finger down onto a touch-sensitive surface in the absence of noise, a calculated centroid of that touch should be stationary. However, in the presence of noise, the calculated centroid may vary (jitter) over time, even though the finger is actually stationary. In some examples, dots per inch (DPI), or alternatively, the inverse of dots per inch (DPI), can be used as a metric for touch jitter, although it should be understood that for applications, other metrics can also be used.

In fine line drawing programs, it can be desirable to limit jitter to about half of a display pixel, so that any noise will not cause an otherwise straight path to be captured and displayed as a jagged path. Accordingly, touch position jitter of half the width of a display pixel or less will not cause an adjacent display pixel to be affected, and thus should have no effect on the displayed image (e.g., no jagged path). However, because touch position jitter of less than half a display pixel is not be resolvable (i.e., has no effect on the display), utilizing a stimulation voltage level that produces touch location jitter of less than half a display pixel may be unnecessary. Accordingly, in some examples of the disclosure, it can be desirable to determine the lowest stimulation signal voltage that can produce a touch patch centroid location in the presence of noise having jitter equal to about half a display pixel.

Figure 9A:
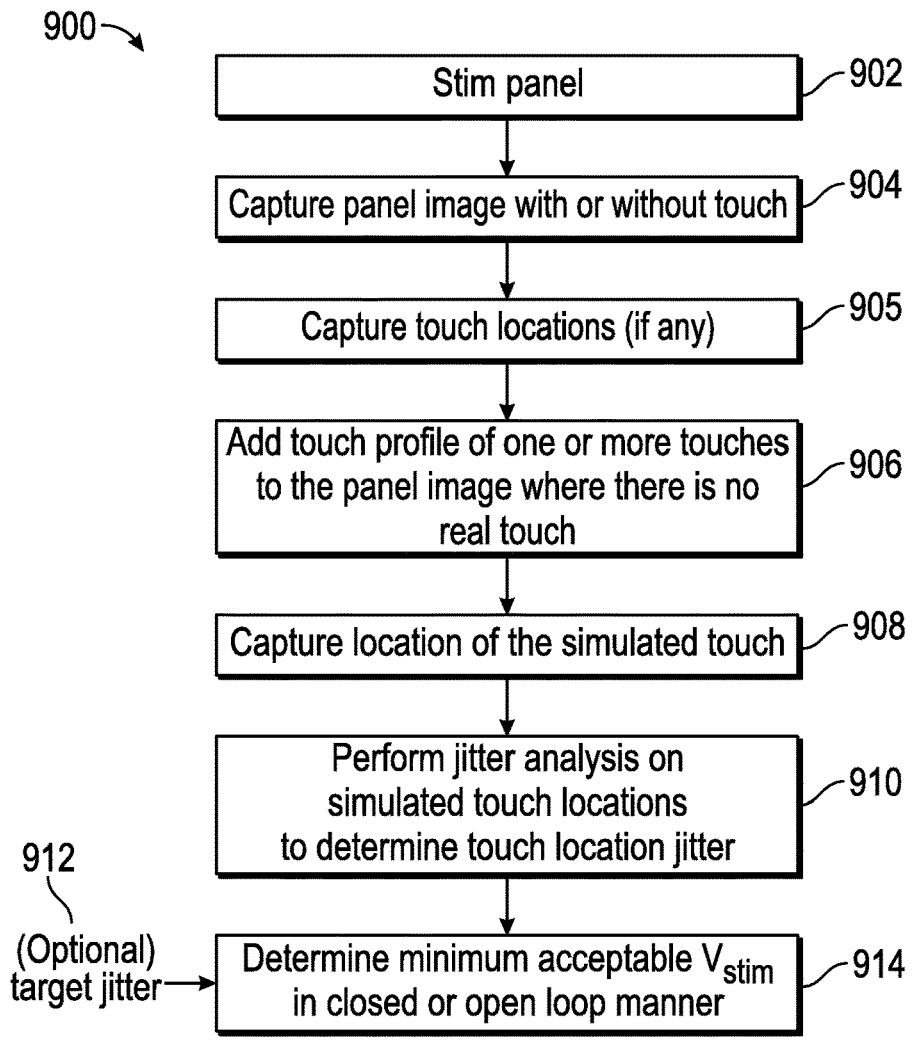
FIG. 9A illustrates an exemplary algorithm for simulating touch centroid jitter according to some examples of the disclosure.

FIG. 9A illustrates an exemplary algorithm 900 for simulating touch centroid jitter according to some examples of the disclosure. In the example of FIG. 9A, noise measurements can be bypassed, and touch centroid jitter (a metric closer to user-level performance) can be measured directly. The algorithm can use one or more simulated touches rather than a real touch. Simulated touches can be necessary when there is no real touch present, or when the real touches are not stationary. In some examples, stimulation signals can be applied to the touch sensor panel at block 902. The sense channels can capture sense signals on the sense lines (i.e., capture a panel image) with or without a touch present and in the presence of a stimulation signal at block 904. Any touch locations in the captured panel image can be identified at block 905. It can be assumed that any variations in these captured sense signals can be due to noise in the system or noise acting upon the system. In some examples, these sense signals can be captured over a predetermined number of frames or time period, in the background during normal device operation when no touch is detected.

Figure 9B:
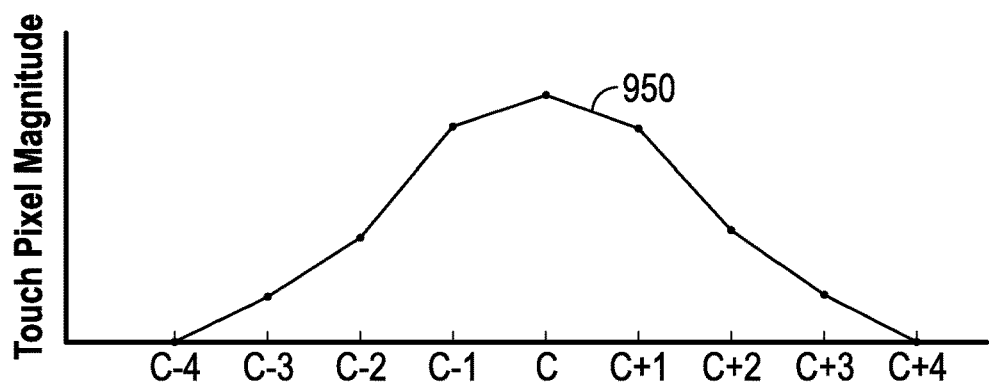
FIG. 9B illustrates an exemplary ideal touch profile according to some examples of the disclosure.

FIG. 9B illustrates an exemplary ideal touch profile 950 according to some examples of the disclosure. In the example of FIG. 9B, the ideal touch profile 950 is shown in a single dimension (e.g., the X dimension) with the centroid located at pixel C, but it should be understood that the ideal touch profile of FIG. 9B can apply to the orthogonal dimension (e.g., the Y dimension) as well.

Referring again to FIG. 9A, in some examples of the disclosure, the touch values of ideal touch profile 950 can be added to the captured panel images over the predetermined number of frames or time period at one or more specified locations where a touch is not present to artificially superimpose or simulate one or more touches on top of the no-touch panel image with noise and generate a simulated touch image at block 906. Adding one or more simulated touches in this manner can eliminate any errors caused by the detection of actual touches, because actual touches may move around over time and the jitter metric assumes a stationary contact. Algorithms (e.g., a watershed algorithm) can be performed on the simulated images of touch over the predetermined number of frames or time period to compute simulated touch locations (e.g., simulated touch patch boundaries and centroids) at block 908, which may shift from the ideal centroid location due to the addition of the noise.

A statistical analysis can then be performed to determine an average magnitude, variance, or other statistical measure of the jitter between the ideal centroid locations and the simulated touch locations at block 910.

The examples disclosed above in FIGS. 6-9 compute touch pixel noise, estimated or actual SNR, or touch location jitter. Each of these metrics can be correlated to touch performance so that a minimum acceptable stimulation voltage can be determined using one or more closed loop methodologies. In general, in some examples of the disclosure, closed loop approaches can iteratively decrease/increase the stimulation voltage through a control algorithm (e.g., PID, Fuzzy, etc.) until the desired SNR is achieved.

Figure 10A:
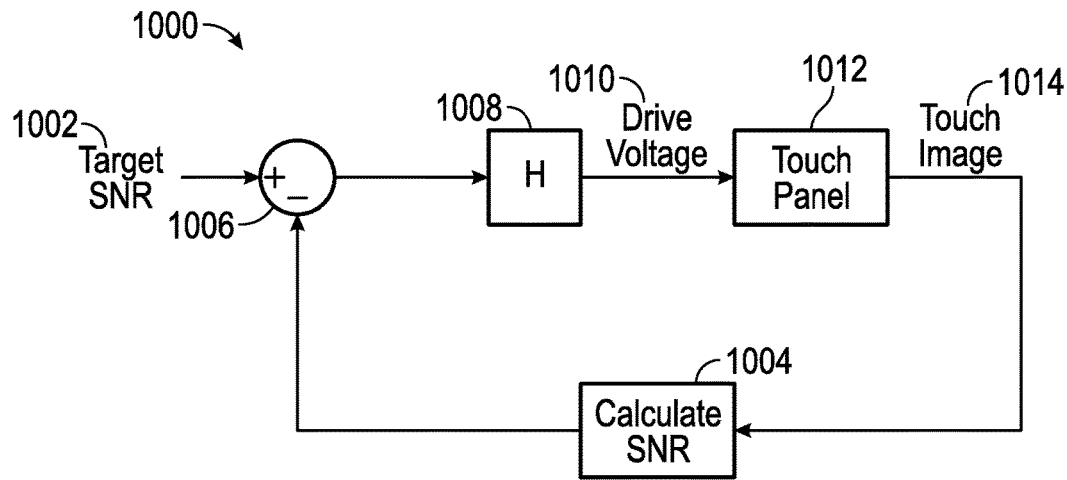
FIG. 10A illustrates an exemplary generic closed loop minimum acceptable stimulation voltage determination system according to some examples of the disclosure.

FIG. 10A illustrates an exemplary generic closed loop minimum acceptable stimulation voltage determination system 1000 according to some examples of the disclosure. In the example of FIG. 10A, a target SNR 1002 is fed into the system, and a difference between the target SNR and a calculated SNR 1004 is computed at 1006 and fed into a SNR-to-Voltage transfer function H 1008 to determine a stimulation voltage level 1010. This stimulation voltage 1010 can be applied to the touch panel 1012 to generate touch image 1014. From the touch image 1014, a new SNR can be calculated at 1004 and fed back into the system. This process can be iteratively performed until the target and calculated SNRs 1002 and 1004 match, and their difference is approximately zero. With zero as an input, the transfer function 1008 can generate a stimulation voltage level 1010 that can be identified as the minimum acceptable stimulation voltage.

Figure 10B:
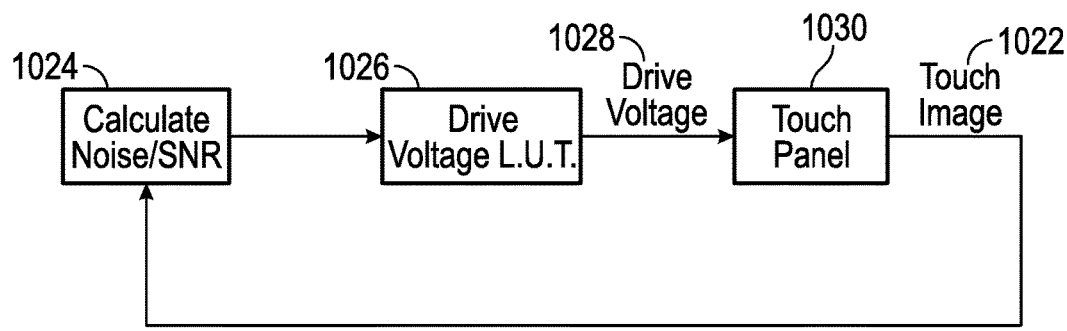
FIG. 10B illustrates an exemplary simplified closed loop minimum acceptable stimulation voltage determination system according to some examples of the disclosure.

FIG. 10B illustrates an exemplary simplified closed loop minimum acceptable stimulation voltage determination system 1020 according to some examples of the disclosure. In the example of FIG. 10B, noise and SNR values can be determined from the touch image 1022 at block 1024, and the SNR can be fed into a stimulation voltage lookup table (LUT) at block 1026, where a stimulation voltage 1028 can be generated. In other words, for each SNR, there is an associated minimum drive voltage determined by characterization/analysis, and this association is captured in the LUT 1026. In other examples, DPI values or inverse DPI values can be determined from the touch image 1022 at block 1024, and the DPI values or inverse DPI values can be fed into the LUT at block 1026, where a stimulation voltage 1028 can be generated. The stimulation voltage 1028 can be applied to the touch panel 1030 to generate a new touch image 1052. From the touch image 1052, new noise and SNR values can be determined and fed back into the system. This process can be iteratively performed as needed to maintain the drive voltage at an acceptable minimum for the current SNR.

Referring again to the methodology for determining noise and an estimated SNR according to FIG. 7, the SNR values computed at block 712 can be fed into a stimulation voltage LUT, where a stimulation voltage can be generated. The stimulation voltage LUT can be generated based on previous characterizations and stored in memory, for example. The stimulation voltage can be applied to the touch panel to generate a new no-touch image. From the no-touch image, new noise values can be determined, and based on a predetermined no touch/full touch output range, new estimated SNR values can be determined. The new estimated SNR values can then be fed back into the system in a closed loop manner as shown in FIG. 10B. This process can be iteratively performed as needed to maintain the drive voltage at an acceptable minimum for the current SNR. This iterative closed loop process is represented by block 716 in FIG. 7.

Referring again to the methodology for determining noise and an actual SNR according to FIG. 8, the SNR values computed at block 816 can be fed into a stimulation voltage LUT, where a stimulation voltage can be generated. The stimulation voltage LUT can be generated based on previous characterizations and stored in memory, for example. The stimulation voltage can be applied to the touch panel to generate a new touch image. From the touch image, touch values can be subtracted, new no-touch noise values can be determined, and based on the actual no touch/full touch output range, new actual SNR values can be determined. The new actual SNR values can then be fed back into the system in a closed loop manner as shown in FIG. 10B. This process can be iteratively performed as needed to maintain the drive voltage at an acceptable minimum for the current SNR. This iterative closed loop process is represented by block 820 in FIG. 8.

Referring again to the methodology for determining noise and touch location jitter according to FIG. 9, the simulated touch location jitter values (in terms of DPI or inverse DPI, for example) computed at 910 can be fed into a stimulation voltage lookup table (LUT), where a stimulation voltage can be generated. The stimulation voltage LUT can be generated based on previous characterizations and stored in memory, for example. The stimulation voltage can be applied to the touch panel to generate a new touch image. From the touch image, new simulated touch location jitter values can be determined. The new touch location jitter values can then be fed back into the system in a closed loop manner as shown in FIG. 10B. This process can be iteratively performed as needed to maintain the drive voltage at an acceptable minimum for the current DPI or inverse DPI.

As an alternative to the closed loop methodologies discussed above, in some examples of the disclosure noise metrics such as touch pixel noise, estimated or actual SNR, or touch location jitter can be correlated to touch performance so that a minimum acceptable stimulation voltage can be determined using an open loop methodology. In general, an open loop approach can calculate the minimum required stimulation voltage based on correlations between noise metrics and touch performance.

Figure 10C:
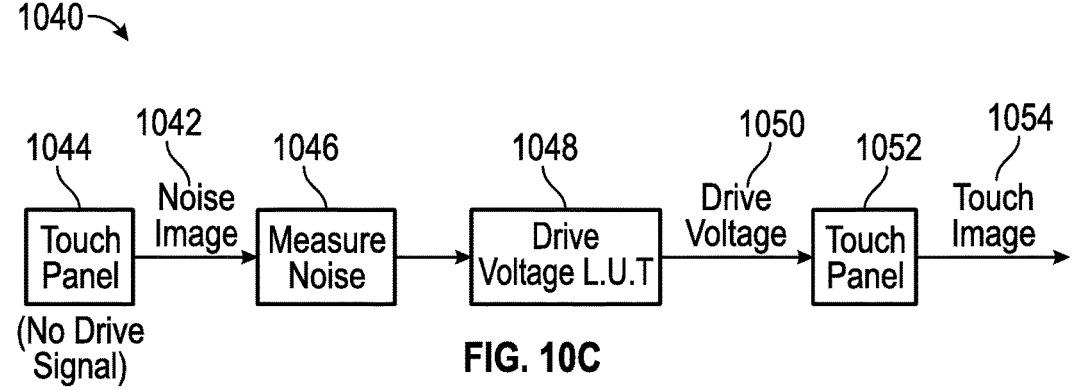
FIG. 10C illustrates an exemplary simplified open loop minimum acceptable stimulation voltage determination system according to some examples of the disclosure.

FIG. 10C illustrates an exemplary simplified open loop minimum acceptable stimulation voltage determination system 1040 according to some examples of the disclosure. FIG. 10C can represent a further simplified version of the simplified closed loop system of FIG. 10B. In the example of FIG. 10C, a noise image 1042 can be obtained from touch panel 1044 without any drive signal being applied, and the noise from the noise image can be measured at block 1046. These values can be fed into a stimulation voltage LUT at block 1048, where a stimulation voltage level 1050 can be generated. The stimulation voltage LUT 1048 can be generated based on previous characterizations and stored in memory, for example. The stimulation voltage 1050 can be applied to the touch panel 1052 to generate a new touch image 1054.

Referring again to the methodology for computing panel noise shown in FIG. 6, because no stimulation signal is provided, in some examples the computed panel noise level can be used as an input to a LUT to determine a minimum acceptable stimulation voltage level in an open-loop manner as shown in FIG. 10C and represented by block 610 in FIG. 6. This stimulation voltage can be applied to the touch panel, and a touch image can be generated.

Referring again to the methodology for computing panel noise and an estimated SNR shown in FIG. 7, in some examples the estimated SNR can be used as an input to a LUT to determine a minimum acceptable stimulation voltage level in an open-loop manner as represented by block 716 in FIG. 7. This stimulation voltage can be applied to the touch panel, and a touch image can be generated.

Referring again to the methodology for computing panel noise and an actual SNR shown in FIG. 8, in some examples the actual SNR can be used as an input to a LUT to determine a minimum acceptable stimulation voltage level in an open-loop manner, as represented by block 820 in FIG. 8. This stimulation voltage can be applied to the touch panel, and a touch image can be generated.

Referring again to the methodology for computing panel noise and touch location jitter shown in FIG. 9, in some examples the simulated touch location jitter can be used as an input to a LUT to determine a minimum acceptable stimulation voltage level in an open-loop manner, and represented by block 914 in FIG. 9. This stimulation voltage can be applied to the touch panel, and a touch image can be generated.

Therefore, according to the above, some examples of the disclosure are directed to a method of determining a stimulation voltage for a touch sensing system, comprising: capturing a plurality of touch sensor panel images over a particular time interval; computing one or more metrics based on the plurality of captured touch sensor panel images; and determining a minimum acceptable stimulation voltage from the one or more metrics. Additionally or alternatively to one or more of the examples disclosed above, in some examples the method further comprises capturing the plurality of touch sensor panel images in an absence of a stimulation signal. Additionally or alternatively to one or more of the examples disclosed above, in some examples computing the one or more metrics comprises computing one or more of an average amplitude and variance of the plurality of captured touch sensor panel images. Additionally or alternatively to one or more of the examples disclosed above, in some examples the method further comprises stimulating the touch sensing system with one or more stimulation signals; and capturing the plurality of touch sensor panel images in an absence of a detected touch. Additionally or alternatively to one or more of the examples disclosed above, in some examples the method further comprises computing an estimated signal-to-noise ratio (SNR) based on the one or more metrics and an assumed full scale amplitude voltage swing of touch and no-touch sense signals received from the touch sensing system. Additionally or alternatively to one or more of the examples disclosed above, in some examples the method further comprises determining a stimulation voltage from the estimated SNR; applying the stimulation voltage to the touch sensing system to generate a revised plurality of captured touch sensor panel images; and calculating a revised estimated SNR from the revised plurality of captured touch sensor panel images. Additionally or alternatively to one or more of the examples disclosed above, in some examples the method further comprises stimulating the touch sensing system with one or more stimulation signals; and capturing the plurality of touch sensor panel images with one or more detected touches. Additionally or alternatively to one or more of the examples disclosed above, in some examples the method further comprises determining one or more touch locations of the one or more detected touches; and excluding the one or more touch locations from the plurality of captured touch sensor panel images to generate a plurality of no-touch sensor panel images. Additionally or alternatively to one or more of the examples disclosed above, in some examples computing the metric comprises computing one or more of an average amplitude and variance of the plurality of no-touch sensor panel images. Additionally or alternatively to one or more of the examples disclosed above, in some examples the method further comprises determining an actual full scale amplitude voltage swing of touch and no-touch sense signals received from the touch sensing system; and computing an actual signal-to-noise ratio (SNR) based on the one or more metrics and the actual full scale amplitude voltage swing. Additionally or alternatively to one or more of the examples disclosed above, in some examples the method further comprises determining a stimulation voltage from the actual SNR; applying the stimulation voltage to the touch sensing system to generate a revised plurality of captured touch sensor panel images; and calculating a revised actual SNR from the revised plurality of captured touch sensor panel images. Additionally or alternatively to one or more of the examples disclosed above, in some examples the method further comprises stimulating the touch sensing system with one or more stimulation signals; determining any actual touch locations from the captured plurality of touch sensor panel images; and adding an ideal touch profile to the plurality of captured touch sensor panel images at one or more predetermined ideal touch locations where no actual touch location has been determined to form a plurality of simulated touch images. Additionally or alternatively to one or more of the examples disclosed above, in some examples the method further comprises computing a plurality of simulated touch locations from the plurality of simulated touch images. Additionally or alternatively to one or more of the examples disclosed above, in some examples computing a metric comprises computing a simulated touch location jitter between the one or more ideal touch locations and the plurality of simulated touch locations. Additionally or alternatively to one or more of the examples disclosed above, in some examples the method further comprises determining a stimulation voltage from the computed simulated touch location jitter; applying the stimulation voltage to the touch sensing system to generate a revised plurality of captured touch sensor panel images; and calculating a revised simulated touch location jitter from the revised plurality of captured touch sensor panel images.

Some examples of the disclosure are directed to a non-transitory computer-readable storage medium having stored therein instructions, which when executed by a device, cause the device to perform a method comprising: capturing a plurality of touch sensor panel images over a particular time interval; computing one or more metrics based on the plurality of captured touch sensor panel images; and determining a minimum acceptable stimulation voltage from the one or more metrics. Additionally or alternatively to one or more of the examples disclosed above, in some examples the method further comprises capturing the plurality of touch sensor panel images in an absence of a stimulation signal. Additionally or alternatively to one or more of the examples disclosed above, in some examples the method further comprises stimulating the touch sensing system with one or more stimulation signals; and capturing the plurality of touch sensor panel images in an absence of a detected touch. Additionally or alternatively to one or more of the examples disclosed above, in some examples the method further comprises computing an estimated signal-to-noise ratio (SNR) based on the one or more metrics and an assumed full scale amplitude voltage swing of touch and no-touch sense signals received from the touch sensing system. Additionally or alternatively to one or more of the examples disclosed above, in some examples the method further comprises stimulating the touch sensing system with one or more stimulation signals; capturing the plurality of touch sensor panel images with one or more detected touches; determining one or more touch locations of the one or more detected touches; and excluding the one or more touch locations from the plurality of captured touch sensor panel images to generate a plurality of no-touch sensor panel images. Additionally or alternatively to one or more of the examples disclosed above, in some examples the method further comprises determining an actual full scale amplitude voltage swing of touch and no-touch sense signals received from the touch sensing system; and computing an actual signal-to-noise ratio (SNR) based on the one or more metrics and the actual full scale amplitude voltage swing. Additionally or alternatively to one or more of the examples disclosed above, in some examples the method further comprises stimulating the touch sensing system with one or more stimulation signals; determining any actual touch locations from the captured plurality of touch sensor panel images; and adding an ideal touch profile to the plurality of captured touch sensor panel images at one or more predetermined ideal touch locations where no actual touch location has been determined to form a plurality of simulated touch images. Additionally or alternatively to one or more of the examples disclosed above, in some examples the method further comprises computing a plurality of simulated touch locations from the plurality of simulated touch images. Additionally or alternatively to one or more of the examples disclosed above, in some examples computing a metric comprises computing a simulated touch location jitter between the one or more ideal touch locations and the plurality of simulated touch locations.

Some examples of the disclosure are directed to a computing device for determining a stimulation voltage for a touch sensing system, comprising: a touch sensor panel; and a touch controller communicatively coupled to the touch sensor panel, the touch controller including one or more transceiver sections for stimulating the touch sensor panel and receiving sense signals from the touch sensor panel, and a processor capable of capturing a plurality of touch sensor panel images over a particular time interval, computing one or more metrics based on the plurality of captured touch sensor panel images, and determining a minimum acceptable stimulation voltage from the one or more metrics.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method of determining a stimulation voltage for a touch sensing system, comprising:
   capturing one or more touch sensor panel images over a particular time interval, each touch sensor panel image captured by stimulating electrodes of a touch sensor panel with a same first stimulation voltage, wherein the one or more touch sensor panel images indicate one or more detected touches;
   computing one or more metrics based on at least one touch sensor panel image that indicates at least one of the one or more detected touches;
   determining a second stimulation voltage amplitude from the one or more metrics;
   dynamically adjusting the stimulation voltage such that an amplitude of the adjusted stimulation voltage is equal to the second stimulation voltage-amplitude determined from the one or more metrics computed based on the at least one touch sensor panel image that indicates at least one of the one or more detected touches; and
   stimulating the touch sensor system with the adjusted stimulation voltage.

2. The method of claim 1, wherein determining the second stimulation voltage amplitude includes determining a difference between the computed one or more metrics and targeted one or more metrics.

3. The method of claim 1, further comprising:
   determining one or more touch locations of the one or more detected touches; and
   excluding the one or more touch locations from the one or more captured touch sensor panel images to generate one or more processed touch sensor panel images without the one or more detected touches.

4. The method of claim 3, wherein computing the one or more metrics comprises computing one or more of an average amplitude and variance of the one or more processed touch sensor panel images without the one or more detected touches.

5. The method of claim 3, further comprising:
   determining an actual full scale amplitude voltage swing of touch and no-touch sense signals received from the touch sensing system; and
   computing an actual signal-to-noise ratio (SNR) based on the one or more metrics and the actual full scale amplitude voltage swing.

6. The method of claim 5, further comprising:
determining the second stimulation voltage amplitude from the actual SNR;
applying the adjusted stimulation voltage to the touch sensing system to generate one or more revised captured touch sensor panel images; and
calculating a revised actual SNR from the one or more revised captured touch sensor panel images.

7. The method of claim 1, further comprising:
determining actual touch locations of the one or more detected touches from the one or more captured touch sensor panel images; and
adding an ideal touch profile to the one or more captured touch sensor panel images at one or more predetermined ideal touch locations where no actual touch location has been determined to form one or more simulated touch images.

8. The method of claim 7, further comprising computing a plurality of simulated touch locations from the one or more simulated touch images.

9. The method of claim 8, wherein computing the one or more metrics comprises computing a simulated touch location jitter between the one or more ideal touch locations and the plurality of simulated touch locations.

10. The method of claim 9, further comprising:
determining the second stimulation voltage amplitude from the computed simulated touch location jitter;
applying the adjusted stimulation voltage to the touch sensing system to generate a one or more revised captured touch sensor panel images; and
calculating a revised simulated touch location jitter from the one or more revised captured touch sensor panel images.

11. The method of claim 1, wherein computing the one or more metrics based on the at least one touch sensor panel image comprises computing the one or more metrics based on a plurality of touch sensor panel images, each of which indicates the one or more detected touches.

12. A non-transitory computer-readable storage medium having stored therein instructions, which when executed by a device, cause the device to perform a method comprising:
capturing one or more touch sensor panel images over a particular time interval, each touch sensor panel image captured by stimulating electrodes of a touch sensor panel with a same first stimulation voltage, wherein the one or more touch sensor panel images indicate one or more detected touches;
computing one or more metrics based on at least one touch sensor panel image that indicates at least one of the one or more detected touches;
determining second stimulation voltage amplitude from the one or more metrics;
dynamically adjusting the stimulation voltage such that an amplitude of the adjusted stimulation voltage is equal to the second stimulation voltage-amplitude determined from the one or more metrics computed based on the at least one touch sensor panel image that indicates at least one of the one or more detected touches; and
stimulating the touch sensor system with the adjusted stimulation voltage.

13. The non-transitory computer-readable storage medium of claim 12, wherein determining the second stimulation voltage amplitude includes determining a difference between the computed one or metrics and targeted one or more metrics.

14. The non-transitory computer-readable storage medium of claim 12, the method further comprising:
determining one or more touch locations of the one or more detected touches; and
excluding the one or more touch locations from the one or more captured touch sensor panel images to generate one or more processed touch sensor panel images without the one or more detected touches.

15. The non-transitory computer-readable storage medium of claim 14, the method further comprising:
determining an actual full scale amplitude voltage swing of touch and no-touch sense signals received from the touch sensing system; and
computing an actual signal-to-noise ratio (SNR) based on the one or more metrics and the actual full scale amplitude voltage swing.

16. The non-transitory computer-readable storage medium of claim 12, the method further comprising:
determining actual touch locations of the one or more detected touches from the one or more captured touch sensor panel images; and
adding an ideal touch profile to the one or more captured touch sensor panel images at one or more predetermined ideal touch locations where no actual touch location has been determined to form one or more simulated touch images.

17. The non-transitory computer-readable storage medium of claim 16, the method further comprising:
computing a plurality of simulated touch locations from the one or more simulated touch images.

18. The non-transitory computer-readable storage medium of claim 17, the method further comprising:
wherein computing the one or more metrics comprises computing a simulated touch location jitter between the one or more ideal touch locations and the plurality of simulated touch locations.

19. The non-transitory computer-readable storage medium of claim 12, wherein computing the one or more metrics based on the at least one touch sensor panel image comprises computing the one or more metrics based on a plurality of touch sensor panel images, each of which indicates the one or more detected touches.

20. A computing device for determining a stimulation voltage for a touch sensing system, comprising:
a touch sensor panel; and
a touch controller communicatively coupled to the touch sensor panel, the touch controller including
circuitry configured to stimulate the touch sensor panel and receive sense signals from the touch sensor panel, and
a processor capable of
capturing one or more touch sensor panel images over a particular time interval, each touch sensor panel image captured by stimulating electrodes of the touch sensor panel with a same first stimulation voltage, wherein the one or more touch sensor panel images indicate one or more detected touches;
computing one or more metrics based on at least one touch sensor panel image that indicates at least one of the one or more detected touches;
determining a second stimulation voltage amplitude from the one or more metrics;
dynamically adjusting the stimulation voltage such that an amplitude of the adjusted stimulation voltage is equal to the second stimulation voltage-amplitude determined from the one or more metrics computed based on at least one touch sensor panel image that indicates at least one of the one or more detected touches; and stimulating the touch sensor system with the adjusted stimulation voltage.

21. The computing device of claim 20, wherein determining the second stimulation voltage amplitude includes determining a difference between the computed one or metrics and targeted one or more metrics.

22. The computing device of claim 20, the processor further capable of:
   determining one or more touch locations of the one or more detected touches; and
   excluding the one or more touch locations from the one or more captured touch sensor panel images to generate one or more processed touch sensor panel images without the one or more detected touches.

23. The computing device of claim 22, the processor further capable of:
   determining an actual full scale amplitude voltage swing of touch and no-touch sense signals received from the touch sensing system; and
   computing an actual signal-to-noise ratio (SNR) based on the one or more metrics and the actual full scale amplitude voltage swing.

24. The computing device of claim 20, the processor further capable of:
   determining actual touch locations of the one or more detected touches from the one or more captured touch sensor panel images; and
   adding an ideal touch profile to the one or more captured touch sensor panel images at one or more predetermined ideal touch locations where no actual touch location has been determined to form one or more simulated touch images.

25. The computing device of claim 24, the processor further capable of:
   computing a plurality of simulated touch locations from the one or more simulated touch images.

26. The computing device of claim 25, the processor further capable of:
   wherein computing the one or more metrics comprises computing a simulated touch location jitter between the one or more ideal touch locations and the plurality of simulated touch locations.

27. The computing device of claim 20, wherein computing the one or more metrics based on the at least one touch sensor panel image comprises computing the one or more metrics based on a plurality of touch sensor panel images, each of which indicates the one or more detected touches.

* * * * *